US007620575B1

(12) United States Patent
Tenorio

(10) Patent No.: US 7,620,575 B1
(45) Date of Patent: Nov. 17, 2009

(54) LOCALLY GENERATING PRICE QUOTES USING ONE OR MORE PRICING TOOLS RECEIVED FROM A SELLER

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 1520 days.

(21) Appl. No.: 09/945,297

(22) Filed: Aug. 31, 2001

(51) Int. Cl.
*G06Q 30/00* (2006.01)

(52) U.S. Cl. .......................................... 705/35; 705/20

(58) Field of Classification Search .................. 705/20, 705/26–27, 35, 37, 64, 74–78, 400, 409; 235/378, 94 A, 61 M, 58 PS; 707/1
See application file for complete search history.

(56) References Cited

U.S. PATENT DOCUMENTS

| | | | | | |
|---|---|---|---|---|---|
| 5,842,178 | A | * | 11/1998 | Giovannoli | 705/26 |
| 6,105,004 | A | * | 8/2000 | Halperin et al. | 705/28 |
| 6,125,355 | A | * | 9/2000 | Bekaert et al. | 705/36 R |
| 6,324,522 | B2 | * | 11/2001 | Peterson et al. | 705/28 |
| 6,615,185 | B1 | * | 9/2003 | Bernstein | 705/26 |
| 7,013,289 | B2 | * | 3/2006 | Horn et al. | 705/26 |
| 2001/0032878 | A1 | * | 10/2001 | Tsiounis et al. | 235/379 |
| 2002/0035511 | A1 | * | 3/2002 | Haji et al. | 705/26 |
| 2002/0138399 | A1 | * | 9/2002 | Hayes et al. | 705/37 |

OTHER PUBLICATIONS

Microsoft Press Computer Dictionary, 3$^{rd}$ edition, 1997, p. 327, ISBN 1-57231-446-X.*
"Tools and Utilities", DBMS, v7, n6, p. 63(29), Jun. 15, 1994.*
@The Moment: The Platform for Real-Time Trading; "How Quickly Can You Respond to Your Markets?" pp. 1, 2001.
@The Moment Solutions; "Dynamic Trading for a Dynamic World" pp. 1, 2001.
Trade@The Moment: The Platform for Real-Time Trading; pp. 1-2, 2001.
@The Moment Real-Time Trading Applications; pp. 1-2, 2001.
@The Moment Professional Services; pp. 1, 2001.

(Continued)

*Primary Examiner*—Mary Cheung
(74) *Attorney, Agent, or Firm*—Booth Udall, PLC; Steven J. Laureanti

(57) ABSTRACT

A system includes one or more computers associated with a buyer for locally generating price quotes. The one or more computers receive a pricing tool from a seller, the pricing tool operable to generate price quotes for the seller, and locally store the pricing tool received from the seller such that the pricing tool is locally accessible to the one or more computers associated with the buyer. The one or more computers access a request for quote (RFQ) specifying an order including quantities of one or more items, the RFQ requesting a price quote for the order, and communicate the RFQ to the locally accessible pricing tool. Using the locally accessible pricing tool received from the seller, the one or more computers locally generate a price quote for the order. The one or more computers provide the locally generated price quote for the order for possible further action by the buyer.

26 Claims, 1 Drawing Sheet

FIG. 1

OTHER PUBLICATIONS

@The Moment Trade @The Moment FAQ; "Frequently Asked Questions (FAQ) About Dynamic Trading" pp. 1-9, 2001.
Trade@The Moment Demos; pp. 1, 2001.
@The Moment Screen Shots; pp. 1-3, 2001.
Market Operator Navigation; pp. 1, 2001.
Market Type Selection Page; pp. 1-2, 2001.
Market Access Control Selection Page; pp. 1-2, 2001.
Market Report; "marketplace@themoment;" pp. 1, 2001.
Bid/Ask Pricing Page, pp. 1-4, 2001.
Auction Page; pp. 1-4, 2001.
Bid/Ask Page/Pitometer; pp. 1-4, 2001.
Bid/Ask Page/Order Book; pp. 1-4, 2001.
@TheMoment Technology; pp. 1-2, 2001.
@TheMoment Papers, pp. 1, 2001.
@TheMoment Reliant Energy Customer Story, "Reliant Energy Turns to @TheMoment to Provide First ERCOT Auction for Electricity Generation Capacity;" pp. 1-2.
@TheMoment White Papers; pp. 1, 2001.
@TheMoment White Paper Series; "Leveraging Web-Based Dynamic Trading for Gas Pipeline Capacity Sales;" pp. 1-8, Jul. 2001.
@TheMoment White Paper Series; "Building Competitive Advantage in Turbulent Markets Through Web-Based Dynamic Trading Technologies;" pp. 1-12, Aug. 2001.
@TheMoment White Paper Series; "Reducing Inventory Risks in High-Tech Component Manufacturing with Forward Contracts;" pp. 1-12, Aug. 2001.
@TheMoment White Paper Series; "The Role off Web-Based Dynamic Trading in Restructured Electric and Gas Markets;" pp. 1-14, Oct. 2001.
Trade@TheMoment: LDC Data Sheet; "The Complete Trading Solution for LDCs;" pp. 1-4, Oct. 2001.
Trade@TheMoment:Power Data Sheet; "The Complete Trading Solution for Electric Utilities;" pp. 1-2, Nov. 2001.

* cited by examiner

LOCALLY GENERATING PRICE QUOTES USING ONE OR MORE PRICING TOOLS RECEIVED FROM A SELLER

TECHNICAL FIELD OF THE INVENTION

This invention relates in general to electronic commerce and more particularly to locally generating price quotes using one or more pricing tools received from a seller.

BACKGROUND OF THE INVENTION

A buyer may have the option of buying from any of a number of different sellers, as well as the option of buying any of a number of different items to meet a particular need. As a result, a buyer may seek to optimize its sourcing by identifying suitable sellers (which may include sellers offering the lowest prices) and suitable items (which may include the lowest-priced items meeting certain requirements) from among the options available to the buyer. To identify suitable sellers and items, a buyer may communicate one or more requests for quote (RFQs) to one or more sellers, receive price quotes in response to the RFQs, and compare the received price quotes. The buyer may communicate a particular RFQ to a large number of sellers and may communicate a large number of related RFQs (meaning RFQs requesting quotes for related orders) to each of these sellers. The buyer may also "shop" a large number of unrelated orders using this or similar RFQ processes. Due to the large number of communications that may be involved in traditional RFQ processes, considerable bandwidth and other network resources may be needed to support these processes where RFQs and price quotes are communicated across networks coupling buyers with sellers. Moreover, seller delays in generating price quotes, network delays in communicating price quotes, network unreliability, and other shortcomings of traditional RFQ techniques may hinder these and similar processes.

SUMMARY OF THE INVENTION

According to the present invention, disadvantages and problems associated with previous RFQ processes may be substantially reduced or eliminated.

In one embodiment of the present invention, a system includes one or more computers associated with a buyer for locally generating price quotes. The one or more computers receive a pricing tool from a seller, the pricing tool operable to generate price quotes for the seller, and locally store the pricing tool received from the seller such that the pricing tool is locally accessible to the one or more computers associated with the buyer. The one or more computers access a request for quote (RFQ) specifying an order including quantities of one or more items, the RFQ requesting a price quote for the order, and communicate the RFQ to the locally accessible pricing tool. Using the locally accessible pricing tool received from the seller, the one or more computers locally generate a price quote for the order. The one or more computers provide the locally generated price quote for the order for possible further action by the buyer.

Particular embodiments of the present invention may provide one or more technical advantages. For example, particular embodiments may facilitate sourcing optimization. Particular embodiments may also facilitate the allocation of bought items among a group of buyers participating in a market as a single buying entity. In particular embodiments, a seller may generate a pricing tool for generating price quotes from the seller and communicate the pricing tool to one or more buyers such that the buyers may locally access the pricing tool to generate price quotes from the seller. In particular embodiments, a buyer may be given local access to a number of different pricing tools, each for generating price quotes from a different seller. Providing buyers local access to pricing tools may reduce the number of RFQ-related communications between buyers and sellers, which may conserve bandwidth and other network resources used for communication between buyers and sellers. Providing buyers local access to pricing tools may also reduce problems associated with seller delays in generating price quotes and network delays in communicating price quotes, which may reduce the amount of time that may be involved in RFQ processes. In particular embodiments, pricing tools may be encrypted such that buyers and competing sellers may be substantially unable to use the pricing tools to deduce seller pricing strategies or otherwise determine how prices offered by the seller are calculated, which may be important where sellers may have an interest in preventing the disclosure of their pricing strategies and related information to customers (which might use the information to effectively take advantage of the pricing strategies) and competitors (which might use the information to gain one or more competitive advantages over the seller) and where sellers may have an interest in preventing their customers from learning that they may be offering better prices to other customers.

Systems and methods incorporating one or more of these or other technical advantages may be well suited for modern electronic commerce environments. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DETAILED DESCRIPTION OF EXAMPLE EMBODIMENTS

Figure 1:
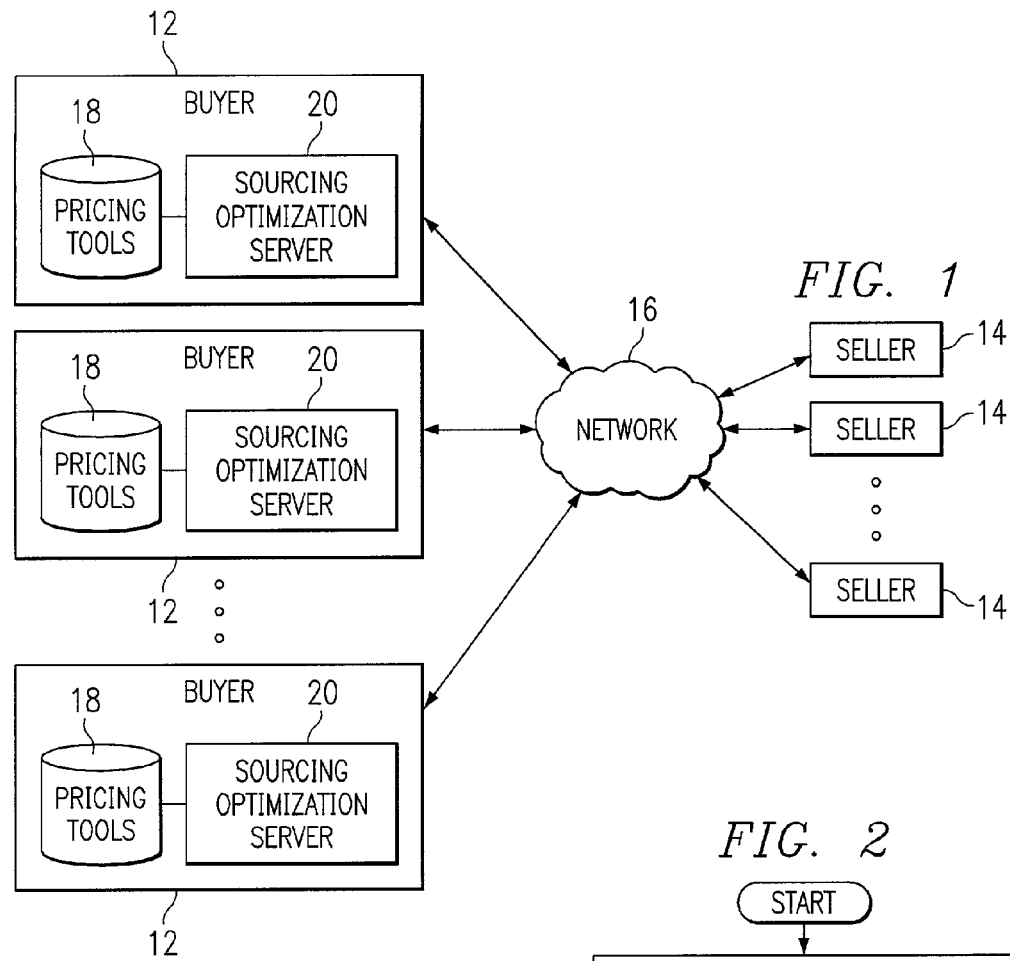
FIG. 1 illustrates an example system for locally generating price quotes using one or more pricing tools received from a seller.

FIG. 1 illustrates an example system 10 for locally generating price quotes using one or more pricing tools received from a seller. System 10 may include one or more buyers 12, one or more sellers 14, and network 16. Network 16 may include any appropriate combination of public and private networks supporting communication between buyers 12 and sellers 14. For example, network 16 may include the Internet and any appropriate local area networks (LANs), metropolitan area networks (MANs), or wide area networks (WANs) coupling buyers 12 with sellers 14. Reference to "buyer" or "seller" may include a person, a computer system, an enterprise, or any other buying or selling entity, as appropriate. For example, buyer 12 may include a computer programmed to autonomously identify a need for an item, search for that item, and buy that item upon identifying a suitable seller 14. Buyer 12 may include a group of individual buyers 12 participating in one or more markets as a single buying entity. Buyer 12 may also include an entity facilitating sourcing optimization for one or more buyers 12. For example, buyer 12 may include an organization that may receive an RFQ from a buyer 12, carry out one or more RFQ processes for buyer 12, and perform other tasks associated with optimizing sourcing for buyer 12, as described more fully below. Although buyers 12 and sellers 14 are described as separate entities, a buyer 12 in one transaction may be a seller 14 in another transaction, and vice versa. Although buying and selling are primarily described, the present invention contemplates any appropriate market transaction.

In traditional RFQ processes, a buyer 12 may communicate to a seller 14, using network 16, an RFQ requesting a price quote for a particular order. In response to receiving the RFQ, seller 14 may generate a price quote for the order and communicate the price quote, also using network 16, to buyer 12. An order may include particular quantities of particular items. For example, an order may include one hundred of item A, two hundred of item B, and one hundred fifty of item C. Items may include raw materials, component parts, products, or other tangible or intangible things that may be the subject of a transaction between a buyer 12 and a seller 14, and a single item may include one or more other items. Additionally, an item included in an order may have a number of different attributes, and there may be a number of possible attribute values (meaning specific instances of attributes) for each attribute. As an example, an order might include a number of computers, each of which may include a number of different parts (such as, for example, a monitor, a keyboard, a mouse, a central processing unit (CPU), memory, other possible hardware, operating system (OS) software, and other possible software), and there may be a number of options associated with each part (such as, for example, monitor size and monitor type).

A buyer 12 may have the option of buying from any of a number of different sellers 14, as well as the option of buying any of a number of different items to meet a particular need. As a result, buyer 12 may seek to optimize its sourcing by identifying suitable sellers 14 (which may include sellers 14 offering the lowest prices) and suitable items (which may include the lowest-priced items meeting certain requirements) from among the options available to buyer 12. To identify suitable sellers 14 and items, buyer 12 may communicate one or more RFQs to one or more sellers 14, receive price quotes in response to the RFQs, and compare the received price quotes. Buyer 12 may "shop" an order by communicating a corresponding RFQ to a number of sellers. Additionally, buyer 12 may communicate a number of related RFQs (meaning RFQs requesting quotes for related orders) to each of these sellers 14 to identify possible modifications to the order (such as, for example, changes to one or more item attribute values, item quantities, or other order variables) that may allow buyer 12 to obtain better prices or other benefits. Buyer 12 may also shop a number of unrelated orders using this or similar RFQ processes.

For example, buyer 12 may generate an RFQ requesting a price quote for an order including one hundred of item A, one hundred fifty of item B (which may be substantially equivalent to item A for purposes of buyer 12), and two hundred of item C, according to one or more particular needs of buyer 12. Buyer 12 may communicate this RFQ to a number of different sellers 14 and wait to receive price quotes from sellers 14. On receiving the price quotes, buyer 12 may compare the quoted prices to identify the lowest prices available from sellers 14. Buyer 12 may then generate a second RFQ requesting a price quote for an order including seventy-five of item A, one hundred seventy-five of item B, and two hundred of item C, communicate the second RFQ to sellers 14, and wait to receive price quotes in response to the second RFQ. On receiving the price quotes in response to the second RFQ, buyer 12 may compare the quoted prices with each other to identify the lowest prices available from sellers 14 for the second order, as well as compare the price quotes for the second order with the price quotes for the first order to determine whether adjusting downward the requested quantity of item A and adjusting upward the requested quantity of item B will allow buyer 12 to obtain better prices or other benefits from sellers 14. Accordingly, traditional RFQ processes may involve a large number of communications between buyer 12 and sellers 14 and may therefore consume substantial bandwidth and other network resources. There may also be substantial delays (due to, for example, network delays and delays in each seller 14 generating a price quote) and other problems associated with such processes.

To reduce these and possibly other limitations of traditional RFQ processes, a seller 14 may generate a pricing tool for generating price quotes from seller 14 and communicate the pricing tool, possibly using network 16, to one or more buyers 12, providing each buyer 12 local access (as described more fully below) to the pricing tool. A pricing tool may include any suitable software component, such as a software agent, that may receive an RFQ and generate a price quote from a particular seller 14 for the order specified in the RFQ. A pricing tool may be generated using any suitable technique and may generate price quotes according to a suitable set of rules reflecting pricing for seller 14. For example, prices available from a particular seller 14 may depend on a number of order variables (such as, for example, the types of items ordered, the quantities of items ordered, the identity of the buyer 12, or other variables), and such dependence may be reflected in a set of rules for generating price quotes.

A pricing tool may reflect sensitive pricing information for a particular seller 14, and seller 14 may have an interest in preventing the disclosure of such information to customers (which might use the information to effectively take advantage of pricing strategies implemented by seller 14) or competitors (which might use the information to gain one or more competitive advantages over seller 14). Additionally, seller 14 may offer different prices to different buyers 12 and want to prevent its customers from learning that seller 14 is offering better prices to other customers. To substantially prevent buyers 12 and competing sellers 14 from using pricing information reflected in a pricing tool from deducing pricing strategies implemented by seller 14 or otherwise determine how prices offered by seller 14 are calculated, the pricing tool may be encrypted using any suitable technique and communicated to buyers 12 in an encrypted format. Additionally, local access to the pricing tool may be limited to particular uses (or restricted in another suitable manner) by requiring that a suitable decryption technique be used to gain access to the pricing tool. For example, an encryption or other suitable "key" may be required to gain access to the pricing tool.

A particular seller 14 may communicate a pricing tool for generating price quotes from seller 14 to a number of different buyers 12, which may reduce the number of RFQ-related communications between seller 14 and buyers 12. Additionally, a particular buyer 12 may receive a number of different pricing tools from a number of different sellers 14, which may allow buyer 12 to shop orders among a number of sellers 14 without having to communicate with sellers 14 or to otherwise reduce the number of RFQ-related communications between buyer 12 and sellers 14. Buyer 12 may store pricing tools in or more databases 18 (although databases are particularly described, pricing tools may be stored using any suitable data storage arrangement), and there may be one or more sourcing optimization servers 20 associated with buyer 12 for generating price quotes and performing other tasks associated with optimizing sourcing for buyer 12. Sourcing optimization server 20 may receive an RFQ, access one or more pricing tools within database 18 for generating price quotes from one or more sellers 14, and using the pricing tools generate one or more price quotes for the order specified in the received RFQ. Sourcing optimization server 20 may also, automatically or at the direction of buyer 12, make suitable modifications to a received order and generate price quotes for the modified order to determine whether modifications to the order will allow the buyer to obtain better prices or other benefits from sellers 14. Sourcing optimization server 20 may automatically repeat this process of modifying an order and generating corresponding price quotes to identify the most suitable combination of order variables, which may be a particular combination of order variables allowing buyer 12 to obtain the lowest possible prices or other benefits from sellers 14. As described above, pricing tools may be encrypted to prevent disclosure of sensitive pricing information to customers and competitors, which may include information that would disclose different prices being offered to different customers. Sourcing optimization server 20 may therefore, in certain embodiments, use a suitable decryption technique to gain access to pricing tools within database 18. For example, sourcing optimization server 20 may use an encryption key to access pricing tools within database 18 and generate price quotes.

Pricing tools communicated to buyer 12 may be locally accessible to buyer 12, which may mean that buyer 12 may access such pricing tools to generate price quotes without communicating across network 16. For example, pricing tools communicated to buyer 12 may be stored in database 18, as described above, and database 18 may be part of a computer system owned and operated by buyer 12, which system may include a number of different computers operating at one or more locations. Moreover, price quotes may be generated, using pricing tools, by sourcing optimization server 20, which may also be part of a computer system owned and operated by buyer 12.

Figure 2:
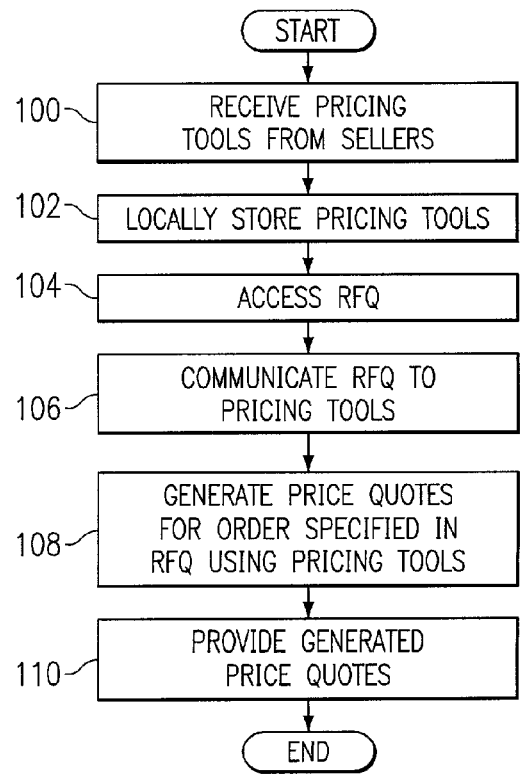
FIG. 2 illustrates an example method for locally generating price quotes using one or more pricing tools received from a seller.

A seller 14 that has communicated a pricing tool to one or more buyers 12 may, in particular embodiments, remotely update the pricing tool to reflect current pricing for sellers 14 using any suitable technique. For example, seller 14 may communicate, using network 16, a new pricing tool to buyers 12 to replace the old pricing tool for generating price quotes from seller 14. As an alternative, seller 14 may communicate information to buyers 12 that may be used to modify the old pricing tool. Such updates may be made at any suitable time. For example, seller 14 may update pricing tools for generating price quotes from seller 14 on a regular basis at a particular time of day when network usage is low. Similar to pricing tools, such updates may contain sensitive pricing information that seller 14 may have an interest in protecting from disclosure. For these and other possible reasons, such updates may be encrypted using any suitable technique to prevent buyers 12 and competing sellers 14 from using pricing information reflected therein from deducing pricing strategies implemented by seller 14 or otherwise determine how prices offered by seller 14 are calculated, which may be important where seller 14 may have an interest in preventing the disclosure of its pricing strategies and related information to customers (which might use the information to effectively take advantage of the pricing strategies) or competitors (which might use the information to gain one or more competitive advantages over the seller) or where seller 14 may have an interest in preventing its customers from learning that seller 14 may be offering better prices to other customers FIG. 2 illustrates an example method for locally generating price quotes using one or more pricing tools received from a seller. The method beings at step 100, where sourcing optimization server 20 receives one or more pricing tools from one or more sellers 14 and locally stores the pricing tools, at step 102, in locally accessible database 18. Although sourcing optimization server 20 and database 18 are particularly described as performing certain tasks associated with generating price quotes, the present invention contemplates any suitable combination of devices associated with buyer 12 performing such tasks. At step 104, sourcing optimization server 20 accesses an RFQ generated by buyer 12 specifying a particular order. As described above, an order may include different quantities of different items. At step 106, sourcing optimization server 20 communicates the RFQ to the locally accessible pricing tools within database 18. The RFQ may be communicated to all or a subset of all of the locally accessible pricing tools within database 18. For example, the RFQ may be communicated only to sellers specified in the RFQ. In addition or as an alternative, the received RFQ may specify one or more seller attribute values (meaning specific instances of attributes for sellers 14) or ranges of values, and sourcing optimization server 20 may search (using any suitable technique) for pricing tools corresponding to sellers 14 substantially matching the seller attribute values and communicate the RFQ only to those pricing tools. At step 108, sourcing optimization server 20 may generate one or more price quotes for the order specified in the received RFQ using the pricing tools. At step 110, sourcing optimization server 20 provides the generated price quotes for possible further action by buyer 12 (such as, for example, comparing generated prices quotes to identify the lowest available prices for the order specified in the RFQ), and the method ends.

Although the present invention has been described with several embodiments, divers changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A computer-implemented system for locally generating price quotes, comprising:
   a plurality of buyer computers coupled with a plurality of sellers via a network, each of the plurality of buyer computers comprising a database and a server, wherein a buyer associated with the plurality of buyer computers comprises a buying group comprising two or more buyers buying items as a single buying entity, each server configured to:
   receive a plurality of pricing tools from the plurality of sellers, each pricing tool configured to generate price quotes for at least one corresponding seller;
   locally store the pricing tools received from the plurality of sellers such that the pricing tools are locally accessible to the server associated with the buying group;
   access a request for quote (RFQ) specifying an order comprising quantities of one or more items, the RFQ requesting one or more price quotes for the order;
   communicate the RFQ to the locally accessible pricing tools;
   using the locally accessible pricing tools received from the plurality of sellers, locally generate one or more price quotes for the order;

provide the locally generated price quotes for the order for possible further action by the buying group;

make one or more modifications to the order specified in the RFQ, the modifications being made based on the price quote for the order generated using the locally accessible pricing tools received from the plurality of sellers;

using the locally accessible pricing tools received from the plurality of sellers, locally generate one or more price quotes for the modified order, provide the locally generated price quotes for the modified order for possible further action by the buyer;

iteratively modify the order and locally generate corresponding price quotes to optimize sourcing for the buying group; and receive a pricing tool update for a particular locally accessible pricing tool, the pricing tool update reflecting one or more price changes for at least one seller, and update the particular locally accessible pricing tool according to the received pricing tool update.

2. A computer-implemented system for locally generating price quotes, the system comprising:

a plurality of buyer computers coupled with a plurality of sellers via a network, each of the plurality of buyer computers comprising a database and a server, each server configured to:

receive one or more pricing tools from one or more of the plurality of sellers, the one or more pricing tools configured to generate one or more price quotes for one or more corresponding plurality of sellers;

locally store the one or more pricing tools received from one or more of the plurality of sellers in the database coupled with each of the plurality of buyer computers, such that the one or more pricing tools are locally accessible to the server coupled with each of the plurality of buyer computers;

access a request for quote (RFQ) specifying an order comprising quantities of one or more items, the RFQ requesting a price quote for the order;

communicate the RFQ to the locally accessible one or more pricing tools stored in the database;

using the locally accessible one or more pricing tools received from one or more of the plurality of sellers, locally generate, at the corresponding buyer computer, one or more price quotes for the order; and provide the locally generated one or more price quotes for the order for possible further action by the corresponding buyer computer.

3. The system of claim 2, wherein the one or more pricing tools are encrypted to prevent the one or more pricing tools from being used to determine how price quotes are calculated.

4. The system of claim 2, wherein a buyer associated with the plurality of buyer computers comprises a buying group comprising two or more buyers buying items as a single buying entity.

5. The system of claim 2, wherein the server is further configured to:

receive a pricing tool update from a seller, the pricing tool update reflecting one or more price changes for the seller; and update the locally accessible one or more pricing tools according to the received pricing tool update.

6. The system of claim 2, wherein the server is further configured to:

make one or more modifications to the order specified in the RFQ, the modifications being made based on the price quote for the order generated using the locally accessible one or more pricing tools received from one or more of the plurality of sellers;

using the locally accessible one or more pricing tools received from one or more of the plurality of sellers, locally generate a price quote for the modified order, and provide the locally generated price quote for the modified order for possible further action by the corresponding buyer computer.

7. The system of claim 6, wherein the one or more modifications to the order are made automatically by the server coupled with each of the plurality of buyer computers based on the locally generated price quote for the order.

8. The system of claim 7, wherein the server is configured to iteratively modify the order and locally generate corresponding price quotes to optimize sourcing for the corresponding buyer computer.

9. The system of claim 2, wherein the server is configured to locally generate the price quote independent of communication with one or more of the plurality of sellers subsequent to receiving the one or more pricing tools from one or more of the plurality of sellers.

10. A computer-implemented method for locally generating price quotes, comprising:

receiving one or more pricing tools from one or more of a plurality of sellers coupled with a plurality of buyer computers, each of the plurality of buyer computers comprising a database and a server, the one or more pricing tools received by the server and configured to generate one or more price quotes for one or more corresponding plurality of sellers;

locally storing, by the server, the one or more pricing tools received from one or more of the plurality of sellers in the database coupled with each of the plurality of buyer computers, such that the one or more pricing tools are locally accessible to the server:

accessing, by the server, a request for quote (RFQ) specifying an order comprising quantities of one or more items, the RFQ requesting a price quote for the order;

communicating, by the server, the RFQ to the locally accessible one or more pricing tools stored in the database;

using the locally accessible one or more pricing tools received from one or more of the plurality of sellers, locally generating, by the server, at the corresponding buyer computer, one or more price quotes for the order; and providing, by the server, the locally generated one or more price quotes for the order for possible further action by the corresponding buyer computer.

11. The method of claim 10, wherein the one or more pricing tools are encrypted to prevent the one or more pricing tools from being used to determine how price quotes are calculated.

12. The method of claim 10, wherein a buyer associated with the plurality of buyer computers comprises a buying group comprising two or more buyers buying items as a single buying entity.

13. The method of claim 10, further comprising:

receiving a pricing tool update from a seller, the pricing tool update reflecting one or more price changes for the seller; and updating the locally accessible one or more pricing tools according to the received pricing tool update.

14. The method of claim 10, further comprising:

making one or more modifications to the order specified in the RFQ, the modifications being made based on the price quote for the order generated using the locally accessible one or more pricing tools received from one or more of the plurality of sellers;

using the locally accessible one or more pricing tools received from one or more of the plurality of sellers, locally generating a price quote for the modified order, and providing the locally generated price quote for the modified order for possible further action by the corresponding buyer computer.

15. The method of claim 14, wherein the one or more modifications to the order are made automatically based on the locally generated price quote for the order.

16. The method of claim 15, further comprising iteratively modifying the order and locally generating corresponding price quotes to optimize sourcing for the corresponding buyer computer.

17. The method of claim 10, wherein locally generating the price quote comprises generating the price quote independent of communication with one or more of the plurality of sellers subsequent to receiving the one or more pricing tools from one or more of the plurality of sellers.

18. Software associated with a plurality of buyer computers for locally generating price quotes, the software embodied in a computer-readable medium and when executed using one or more computers is configured to:

receive one or more pricing tools from one or more of a plurality of sellers coupled with a plurality of buyer computers, each of the plurality of buyer computers comprising a database and a server, the one or more pricing tools configured to generate one or more price quotes for one or more corresponding plurality of sellers;

locally store the one or more pricing tools received from one or more of the plurality of sellers in the database, such that the one or more pricing tools are locally accessible to the software associated with the buyer computer;

access a request for quote (RFQ) specifying an order comprising quantities of one or more items, the RFQ requesting a price quote for the order;

communicate the RFQ to the locally accessible one or more pricing tools stored in the database;

using the locally accessible one or more pricing tools received from one or more of the plurality of sellers, locally generate, at the corresponding buyer computer, one or more price quotes for the order; and provide the locally generated one or more price quotes for the order for possible further action by the corresponding buyer computer.

19. The software of claim 18, wherein the one or more pricing tools are encrypted to prevent the one or more pricing tools from being used to determine how price quotes are calculated.

20. The software of claim 18, wherein a buyer associated with the plurality of buyer computers comprises a buying group comprising two or more buyers buying items as a single buying entity.

21. The software of claim 18, further configured to:

receive a pricing tool update from a seller, the pricing tool update reflecting one or more price changes for the seller; and update the locally accessible one or more pricing tools according to the received pricing tool update.

22. The software of claim 18, further configured to:

make one or more modifications to the order specified in the RFQ, the modifications being made based on the price quote for the order generated using the locally accessible one or more pricing tools received from one or more of the plurality of sellers;

using the locally accessible one or more pricing tools received from one or more of the plurality of sellers, locally generate a price quote for the modified order, and provide the locally generated price quote for the modified order for possible further action by the corresponding buyer computer.

23. The software of claim 22, wherein the one or more modifications to the order are made automatically by a server coupled with the plurality of buyer computers based on the locally generated price quote for the order.

24. The software of claim 23, further configured to iteratively modify the order and locally generate corresponding price quotes to optimize sourcing for the corresponding buyer computer.

25. The software of claim 18, further configured to locally generate the price quote independent of communication with one or more of the plurality of sellers subsequent to receiving the one or more pricing tools from one or more of the plurality of sellers.

26. A computer-implemented system for locally generating price quotes, comprising:

a plurality of buyer computers coupled with a plurality of sellers via a network, each of the plurality of buyer computers comprising a database and a server, each server comprising:

means for receiving one or more pricing tools from one or more of the plurality of sellers, the one or more pricing tools configured to generate one or more price quotes for one or more corresponding plurality of sellers;

means for locally storing the one or more pricing tools received from one or more of the plurality of sellers in the database coupled with each of the plurality of buyer computers, such that the one or more pricing tools are locally accessible to the server coupled with each of the plurality of buyer computers;

means for accessing a request for quote (RFQ) specifying an order comprising quantities of one or more items, the RFQ requesting a price quote for the order;

means for communicating the RFQ to the locally accessible one or more pricing tools stored in the database;

means for locally generating, at the corresponding buyer computer, one or more price quotes for the order using the locally accessible one or more pricing tools received from one or more of the plurality of sellers; and means for providing the locally generated one or more price quotes for the order for possible further action by the corresponding buyer computer.

* * * * *

UNITED STATES PATENT AND TRADEMARK OFFICE
CERTIFICATE OF CORRECTION

PATENT NO. : 7,620,575 B1
APPLICATION NO. : 09/945297
DATED : November 17, 2009
INVENTOR(S) : Manoel Tenorio Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1747 days.

Signed and Sealed this

Twenty-sixth Day of October, 2010

David J. Kappos
*Director of the United States Patent and Trademark Office*